J. EULBERG.
WHEEL AND DEMOUNTABLE RIM.
APPLICATION FILED OCT. 18, 1919.
1,387,372.
Patented Aug. 9, 1921.
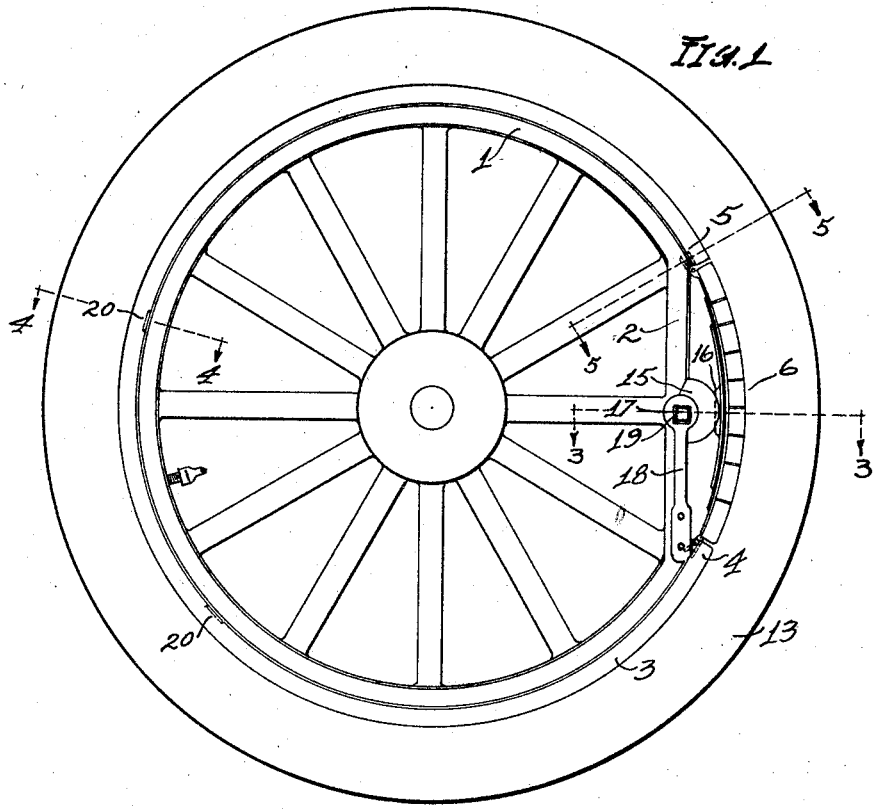
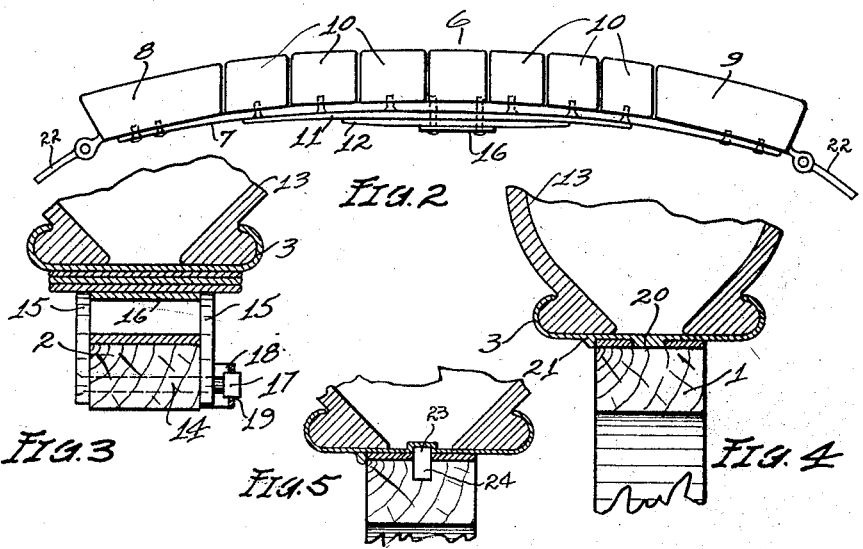
INVENTOR
JOSEPH EULBERG.
BY C. D. Enochs
ATTORNEY

UNITED STATES PATENT OFFICE.

JOSEPH EULBERG, OF ALTON, IOWA.

WHEEL AND DEMOUNTABLE RIM.

1,387,372.   Specification of Letters Patent.   Patented Aug. 9, 1921.

Application filed October 18, 1919.  Serial No. 332,081.

*To all whom it may concern:*

Be it known that I, JOSEPH EULBERG, a citizen of the United States, and a resident of Alton, in the county of Sioux and State of Iowa, have invented certain new and useful Improvements in Wheels and Demountable Rims, of which the following is a specification.

One object of my invention is to provide a demountable rim of such style that a tire may be readily removed therefrom.

Another object is to provide an automobile wheel with a substantially flat portion and a rim having a portion thereof formed to easily slip over the flat portion of the wheel.

Another object is to provide in a rim a spring controlled collapsible portion.

Another object is to provide improved means for locking the rim to the wheel.

With these and incidental objects in view, the invention consists of certain novel features of construction and combination of parts, the essential elements of which are hereinafter described with reference to the drawing which accompanies and forms a part of this specification.

In the drawing, Figure 1 is a slide elevation of my improved form of wheel and rim; Fig. 2 is an enlarged detail of the collapsible portion of the rim; Fig. 3 is a section taken on the line 3—3, Fig. 1; Fig. 4 is a section taken on the line 4—4, Fig. 1; and Fig. 5 is a section taken on the line 5—5 Fig. 1.

As shown in Fig. 1, the felly 1 of the wheel has a flattened portion 2; the rim 3 is an ordinary design up to points 4 and 5. Hinged at 4 and 5 to the rim is a flexible rim member 6 formed by riveting to the flat spring 7 the hinge sections 8 and 9, and multiple sections 10, so spaced as to allow the spring 7 to readily flex.

Additional leaves, such as 11 and 12, are provided to strengthen the spring 7, and are of such a stiffness that they will draw the collapsible portion 6 from the arc of a circle, as shown in Fig. 1, to a flattened position, as shown in Fig. 2, when the tire 13 is fully inflated.

Suitably journaled in the flat portion 2 of the felly 1 is a shaft 14 to which is keyed, or otherwise suitably fastened, a cam 15, adapted to impinge against the leaf 12 straddling the plate 16 riveted to the leaf springs.

A squared head 17 on the shaft 14 provides means for turning the cam and a spring clip 18, having a squared aperture 19, Fig. 1, locks the cam in its set position, but allows it to be readily turned by pressing the spring clip 18 inwardly out of engagement with the squared head 17 by means of a suitable wrench.

When the cam 15 is retracted and the collapsible portion assumes its flattened position sufficient clearance is provided between the rim and the felly for the rim to be readily removed from the wheel, and when the cam is extended thereby pressing the collapsible portion into the shape of an arc of a circle, the felly is firmly gripped by the rim, and the friction of this grip together with lock pads 20 firmly holds the rim to the wheel.

The rim 3 is provided with a shoulder 21, Fig. 4, to serve as a stop so the rim may be shoved firmly against this stop when it is being applied to a wheel.

The hinged sections 8 and 9 have projections 22 therein and the rim ends at 4 and 5 are provided with recesses 13 so that when the flexible portion is collapsed the projections will lie within these recesses and clear the felly so the rim may be withdrawn from the wheel.

When, however, the flexible portion is forced into the same arc as the rim the projections 22 swing down into recesses 24 in the felly and serve to lock the rim onto the felly at these two points.

While I have described my invention and illustrated it in one particular design, I do not wish it understood that I limit myself to this construction, as it is evident that the application of the invention may be varied in many ways within the scope of the following claims.

Claims:

1. In a demountable rim the combination of a main portion formed of a general circular shape, but having an opening between the two ends thereof, a flexible member hinged to said open ends, and spring means for normally holding said flexible member in a partially flattened shape.

2. In a demountable rim the combination of a normally arc shaped portion, a flexible portion hinged to the ends of said arc shaped portion, and spring means for normally holding said flexible portion flattened in respect to the arc of said arc shaped portion.

3. In a demountable rim the combination of an arc shaped portion having two free ends, a flexible portion hinged to said free ends, and formed of a spring and multiple rim segments.

4. In a wheel and demountable rim the combination of a felly having one portion thereof flattened, a rim including an arc shaped portion, and a flexiblel portion hinged to said arc shaped portion, spring means for normally holding said flexible portion flattened in respect to said arc shaped portion, and means for forcing said flexible portion to lie in the same circle as said arc shaped portion.

5. In a wheel and demountable rim the combination of a felly having one portion thereof flattened, a rim including an arc shaped portion and a flexible portion hinged to said arc shaped portion, spring means for normally holding said flexible portion flattened in respect to said arc shaped portion, means for forcing said flexible portion to lie in the same circle as said arc shaped portion, and means for locking said last named means.

6. In a wheel and demountable rim the combination of a felly having one portion thereof flattened, a rim including an arc shaped portion and a flexible portion hinged to said arc shaped portion, spring means for normally holding said flexible portion flattened in respect to said arc shaped portion, extensions carried by said flexible portion and extending beyond the hinged joints thereof, and adapted to lie within recesses in the arc shaped portion of said rim when said flexible portion is flattened in respect to the arc of said rim, and to lie in recesses in said felly when said flexible portion lies in the arc of said rim.

JOSEPH EULBERG.